(12) United States Patent
Choi et al.

(10) Patent No.: US 9,916,814 B2
(45) Date of Patent: Mar. 13, 2018

(54) SYSTEM ON CHIP, OPERATION METHOD OF THE SAME, AND MOBILE DEVICE INCLUDING THE SAME

(71) Applicant: SAMSUNG ELECTRONICS CO., LTD., Suwon-si, Gyeonggi-do (KR)

(72) Inventors: Hong Mi Choi, Hwaseong-si (KR); Yong-Bae Song, Hwaseong-si (KR); Jong Ho Roh, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 198 days.

(21) Appl. No.: 13/733,305

(22) Filed: Jan. 3, 2013

(65) Prior Publication Data
US 2013/0201124 A1 Aug. 8, 2013

(30) Foreign Application Priority Data
Feb. 7, 2012 (KR) .................. 10-2012-0012488

(51) Int. Cl.
| | |
|---|---|
| G06F 1/00 | (2006.01) |
| G09G 5/36 | (2006.01) |
| G06F 3/041 | (2006.01) |
| G09G 5/395 | (2006.01) |

(52) U.S. Cl.
CPC ........... *G09G 5/363* (2013.01); *G06F 3/0412* (2013.01); *G09G 5/395* (2013.01); *G09G 2330/023* (2013.01); *G09G 2360/08* (2013.01); *G09G 2360/18* (2013.01); *G09G 2370/08* (2013.01); *G09G 2370/10* (2013.01)

(58) Field of Classification Search
CPC .................................. G06F 15/00; G09G 5/36
See application file for complete search history.

(56) References Cited

U.S. PATENT DOCUMENTS

| | | | |
|---|---|---|---|
| 7,362,295 B2 | 4/2008 | Park et al. | |
| 7,893,933 B2 | 2/2011 | Yi et al. | |
| 2002/0140685 A1* | 10/2002 | Yamamoto et al. | 345/204 |
| 2007/0285428 A1 | 12/2007 | Foster et al. | |
| 2009/0219295 A1* | 9/2009 | Reijnaerts | 345/501 |
| 2009/0251434 A1* | 10/2009 | Rimon et al. | 345/173 |
| 2010/0123727 A1 | 5/2010 | Kwa et al. | |
| 2011/0078536 A1* | 3/2011 | Han et al. | 714/758 |
| 2012/0320020 A1* | 12/2012 | Chiba | 345/211 |

FOREIGN PATENT DOCUMENTS

| | | |
|---|---|---|
| JP | 2004151222 | 5/2004 |
| JP | 2006184357 | 7/2006 |
| JP | 2010026219 | 2/2012 |
| KR | 1020030083070 | 10/2003 |
| KR | 1020070042636 | 4/2007 |
| KR | 1020090039885 | 4/2009 |

\* cited by examiner

*Primary Examiner* — Michael Faragalla
(74) *Attorney, Agent, or Firm* — F. Chau & Associates, LLC

(57) ABSTRACT

A system on chip (SoC) includes a display controller configured to receive data of a current frame and to determine whether the data of the current frame has been updated from data of a previous frame, and a transmitter configured to output a panel self-refresh (PSR) inactive command and the data of the current frame when the display controller determines that the data of the current frame has been updated and to transmit a panel self-refresh (PSR) active command when the display controller determines that the data of the current frame has not been updated.

16 Claims, 11 Drawing Sheets

FIG. 3

| | 7 | 6 | 5 | 4 | 3 | 2 | 1 | 0 |
|---|---|---|---|---|---|---|---|---|
| HB0 | Secondary Data Packet ID ||||||||
| HB1 | Secondary Data Packet Type ||||||||
| HB2 | Reserved = 0 |||| Revision ||||
| HB3 | Reserved = 0 |||| Number of Valid Payload Bytes ||||

| | | |
|---|---|---|
| DB0 | Stereo Interface Method Specific Parameter | Stereo Interface Method Code |
| DB1 | PSR ||
| DB3-DB2 | CRC Value R or Cr component ||
| DB5-DB4 | CRC Value G or Y component ||
| DB7-DB6 | CRC Value B or Cb component ||
| DB31-DB8 | Reserved = 0 ||

FIG. 4

| Byte # | Detailed Bit Definitions |
|---|---|
| DB1 | Bit 0 = PSR State<br>0 = PSR Inactive (normal operation mode)<br>1 = PSR Active (indication to enter PSR) |
| | Bit 1 = Update RFB (If PSR State bot received in the previous VSC SDP is 0 or if PSR State in this VSC SDP is 0, ignore this bit)<br>0 = Do not update RFB<br>1 = Update RFB:capture incoming frame into the RFB |
| | Bit 2 = CRC Valid<br>0 = CRC values in DB7:2 are invalid<br>1 = CRC values in DB7:2 are valid |
| | Bits 7:3 = RESERVED Read all 0s |

SYSTEM ON CHIP, OPERATION METHOD OF THE SAME, AND MOBILE DEVICE INCLUDING THE SAME

CROSS-REFERENCE TO RELATED APPLICATIONS

This application claims priority under 35 U.S.C. § 119(a) from Korean Patent Application No. 10-2012-0012488 filed on Feb. 7, 2012, the disclosure of which is hereby incorporated by reference in its entirety.

TECHNICAL FIELD

Embodiments of the inventive concept relate to a system on chip (SoC) controlling a panel self-refresh operation with an error check algorithm.

DISCUSSION OF RELATED ART

With the increase of image resolution, data traffic between mobile application processors and display driver integrated circuits (ICs) has rapidly increased. Accordingly, power consumption of the mobile application processor and/or the display driver IC has also increased.

Mobile devices which support multimedia data communication perform a graphic operation for refreshing a screen image. This refresh operation necessitates frequent communication between the application processor and various functional blocks such as a display driver IC, resulting in reduction of the battery duration. The battery duration is the time during which a battery can be continuously used once charged. Therefore, reduction of power consumption is desired in light of the refresh operation.

SUMMARY

In an embodiment, a system on chip (SoC) comprises a display controller configured to receive data of a current frame and to determine whether the data of the current frame has been updated from data of a previous frame, and a transmitter configured to output a panel self-refresh (PSR) inactive command and the data of the current frame when the display controller determines that the data of the current frame has been updated and to transmit a panel self-refresh (PSR) active command when the display controller determines that the data of the current frame has not been updated. The SoC further comprises a memory controller configured to receive the data of the current frame and the data of the previous frame from a memory.

In an embodiment, the data of the current frame are data of a predetermined region of the current frame, and the data of the previous frame are data of a corresponding region of the previous frame. The display controller is configured to perform an error check algorithm based on the data of the previous frame to determine whether the data of the current frame has been updated.

In an embodiment, the display controller comprises an update detector configured to determine whether the data of the current frame has been updated from the data of the previous frame using an error check algorithm, and an interrupt module configured to generate an interrupt request for the PSR inactive command when the update detector determines that the current frame has been updated.

In an embodiment, the interrupt module is configured to generate an interrupt request for the PSR inactive command when a user event occurs. The user event occurs when a user touches a screen.

In an embodiment, the SoC comprises an interrupt controller configured to transmit an interrupt signal in response to the interrupt request, and a central processing unit configured to generate a transmission control command in response to the interrupt signal. The transmitter comprises a register configured to store at least two panel self-refresh operation control command values and to output one of the at least two panel self-refresh operation control command values to the display device in response to the transmission control command.

In an embodiment, the display controller comprises an update detector configured to determine whether the data of the current frame has been updated from the data of the previous frame using an error check algorithm, and a central processing unit configured to generate a transmission control command according to a determination result of the update detector, wherein the transmitter outputs a panel self-refresh operation control command value corresponding to the determination result of the update detector to the display device. The transmitter comprises a register configured to store the panel self-refresh operation control command value.

In one embodiment, the transmitter comprises a register configured to store at least two panel self-refresh operation control, and a panel self-refresh controller configured to control the register to output one of the panel self-refresh operation control command values to the display device according to a determination result of the update detector.

In one embodiment, an operation method of a system on chip (SoC) comprises receiving image data of a current frame, determining whether the image data of a current frame is updated based on image data of a pervious frame using an error check algorithm, outputting a panel self-refresh (PSR) inactive command and the image data of the current frame when it is determined that the image data of the current frame has been updated from the data of the previous frame, and outputting a panel self-refresh (PSR) active command when it is determined that the data of the current frame has not been updated from the data of the previous frame.

In one embodiment, the data of the current frame are data of a predetermined region of the current frame, and the data of the previous frame are data of a corresponding region of the previous frame.

In one embodiment, the error check algorithm comprises a cyclic redundancy check algorithm having a CRC's divisor, wherein the CRC's divisor is determined based on the data of the previous frame and a determination result of the step of determining whether the image data of a current frame is updated is represented by a remainder of the cyclic redundancy check algorithm.

In one embodiment, the step of outputting the panel self-refresh active command comprises generating an interrupt signal when it is determined that the current frame has been updated from the previous frame, setting a first register value for a panel self-refresh operation in response to the interrupt signal, and outputting the panel self-refresh active command based on the first register value.

In one embodiment, the operation method further comprises a step of outputting a panel self-refresh (PSR) inactive command when a user event has occurred.

In one embodiment, a method of operating a image data operating system comprise displaying a still image with data of a previous frame, generating a new image data, determining whether the new image data has been updated based on the still image using an error check algorithm, and displaying the new image data and storing the new image data when it is determined that the new image data has been updated.

In one embodiment, the error check algorithm comprises a cyclic redundancy check algorithm having a CRC's divisor, wherein the CRC's divisor is determined based the data of the previous frame and a determination result of the step of determining whether the image data of a current frame is updated is represented by a remainder of the cyclic redundancy check algorithm.

In one embodiment, the operation method further comprises a step of generating an interrupt signal in response to a determination result of the step of the step of determining whether the image data of a current frame has been updated.

BRIEF DESCRIPTION OF THE DRAWINGS

The above and other features and advantages of the inventive concept will become more apparent by describing in detail exemplary embodiments thereof with reference to the attached drawings in which:

FIG. 3 is a table of packet information which shows panel self-refresh features according to an Embedded DisplayPort (eDP) standard and which is transmitted and received by the image data processing system of FIG. 1;

FIG. 4 is a table of bit information showing in detail the packet information of FIG. 3;

DETAILED DESCRIPTION OF THE EMBODIMENTS

Figure 1:
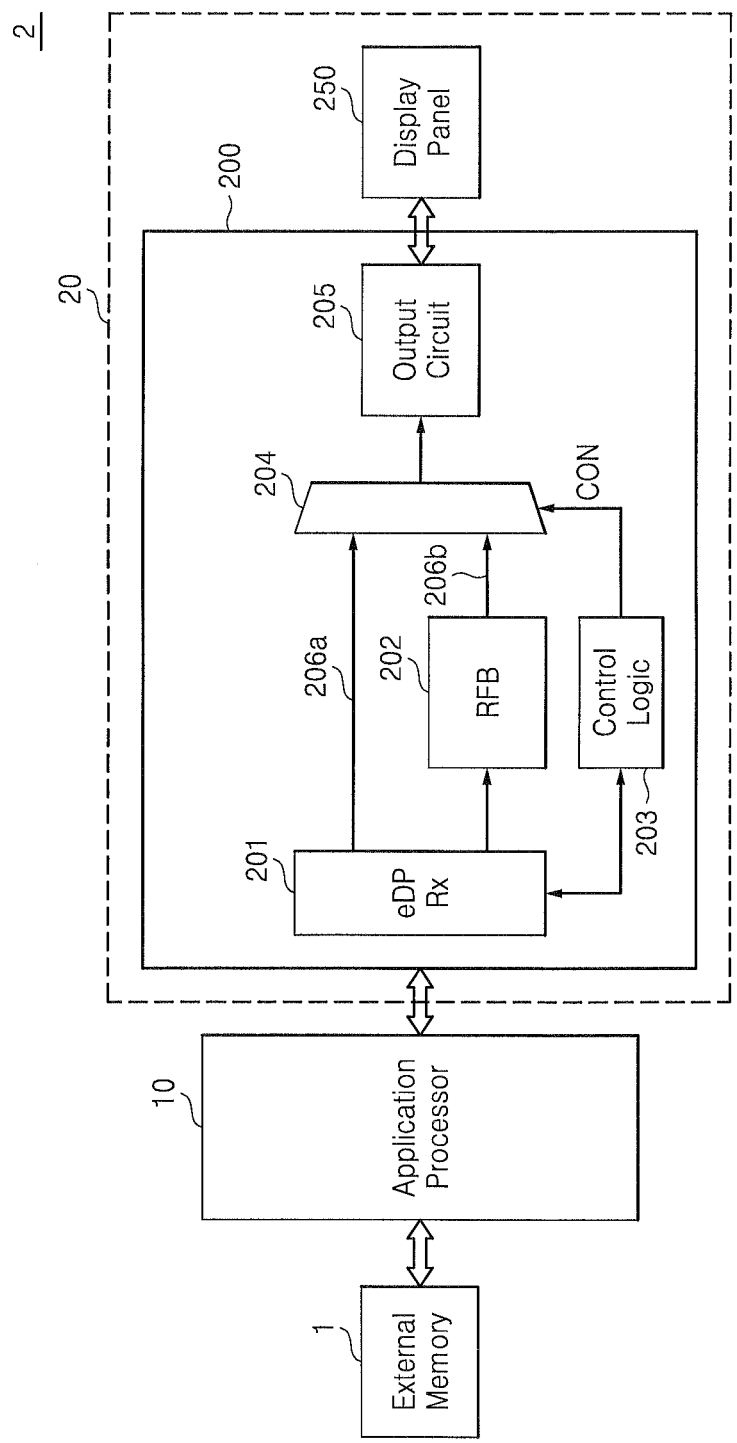
FIG. 1 is a block diagram of an image data processing system according to an embodiment of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image data processing system 2 according to an embodiment of the inventive concept. In FIG. 1, the image data processing system 2 includes an external memory 1, a system on chip (SoC) 10, and a display device 20. Each of the elements 1, 10, and 20 may be implemented in a separate chip. The image data processing system 2 may be a mobile device, a handheld device, or a handheld computer, such as a mobile phone, a smart phone, a tablet personal computer (PC), a personal digital assistant (PDA), a portable multimedia player (PMP), an MP3 player, or an automotive navigating system, which can display a still image signal (or a still image) or a moving image signal (or a moving image).

The SoC 10 may control the external memory 1 and/or the display device 20 for reproduction of image data to be displayed. The SoC 10 may also be referred to as an application processor. The SoC 10 will be described in detail with reference to FIG. 2 later.

The display device 20 includes a display driver 200 and a display panel 250. The SoC 10 and the display driver 200 may be implemented together in a single module. In other embodiments, the SoC 10 and the display driver 200 may be implemented as a single SoC, or as a multi-chip package. The display driver 200 includes a receiver 201, a refresh frame buffer (RFB) 202, a control logic 203, a selector 204, and an output circuit 205. The display driver 200 may also include a buffer controller (not shown) that controls the input/output of an image signal stored in the RFB 202. The display driver 200 includes two signal paths such as an update signal path 206a and a no-update signal path 206b between the SoC 10 and the display panel 250. The display driver 200 selects one of the two signal paths 206a and 206b according to a panel self-refresh (PSR) operation command output from the SoC 10. When the PSR operation command is a PSR active command, the no-update signal path 206b is selected, and the image data of the SoC are transmitted to the display panel 250 while temporarily being stored in the RFB 202. When the PSR operation command is a PSR inactive command, the update signal path 206a is selected, and the image data previously stored in the RFB are transmitted to the display panel 250. The image data processing system 2 runs a PSR operation when displaying the image data previously stored in the RFB.

The receiver 201 receives the PSR operation command and the image data from the SoC 10 according to an Embedded DisplayPort (eDP) standard. The PSR operation command includes a PSR operation control command value. The eDP standard may be eDP standard version 1.3 or later.

The control logic 203 controls the overall operation of the display driver 200. The control logic 203 may control the receiver 201, the RFB 202, the selector 204 and other elements according to an output signal of the receiver 201.

The selector 204 selects one of the update signal path 206b and the no-update signal path 206a according to a control signal CON. The update signal path 206b is a signal path without the RFB 202 between the receiver 201 and the selector 204, transmitting the image data from the application processor 10. The no-update signal path 206b includes the RFB 202 and transmits the image data previously stored in the RFB. The inventive concept is not restricted to this embodiment. In other embodiments, a buffer controller (not shown here) may select the data paths 206a and 206b according to the control signal CON of the control logic 203. The output circuit 205 outputs the image data along one of the signal paths 206a and 206b selected by the selector 204 to the display panel 250.

In operation, the SoC 10 initially transmits image data of one frame, and a PSR active command to the display driver 200. Alternatively, the SoC 10 may transmit image data corresponding to a predetermined region of an entire image. The display driver 200 selects the no-update signal path 206b according to the PSR active command. Specifically, in response to the PSR active command, the display driver 200 stores the image data to the RFB 202. The selector 204 selects the no-update signal path 206b, outputting the image data stored in the RFB 202. While the PSR active command remains valid, the display driver 200 refreshes the display panel 250 with the image data stored in the RFB 202 through the output circuit 205.

When the SoC 10 transmits new image data different from that stored in the RFB 202 or being displayed on the display panel 250, the SoC 10 transmits a PSR inactive command along with the new image data to the display driver 200. The display driver 200 selects the update signal path 206a according to the PSR inactive command while the new image data is stored in the RFB 202. The SoC 10 may send the PSR inactive command to the display driver 200 when a separate user event occurs.

Specifically, the display driver 200 selects the update signal path 206a that outputs directly without passing through the RFB 202. According to the PSR inactive command, the selector 204 outputs the new image data of the update signal path 206a to the display panel 250 via the output circuit 205, and the RFB 202 also stores the new image data. The stored new image signal may be used when the SoC 10 sends a PSR active command afterwards. Alternatively, the image data may correspond to that of the predetermined region of an entire image.

The display panel 250 displays the image data output from the display driver 200. The display panel 250 may be implemented as a liquid crystal display (LCD), a light emitting diode (LED) display, an organic LED (OLED) display, or an active-matrix OLED (AMOLED) display.

Figure 2:
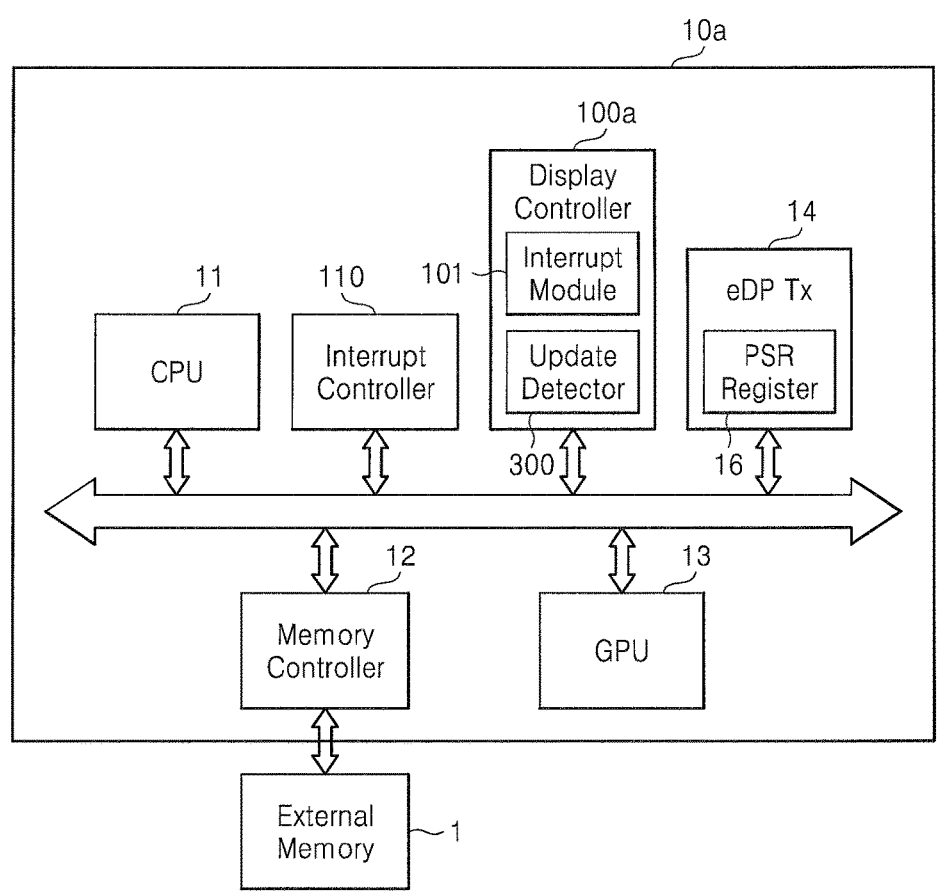
FIG. 2 is a detailed block diagram of an application processor according to an embodiment of the inventive concept.

FIG. 2 is a detailed block diagram of an application processor 10a according to an embodiment of the inventive concept. The application processor 10a corresponds to the SoC 10 of FIG. 1. In FIG. 2, the application processor 10a includes a central processing unit (CPU) 11, an interrupt controller 110, a display controller 100a, a memory controller 12, a graphic processing unit (GPU) 13, and a transmitter 14.

The memory controller 12 controls the operation of an external memory 1 for transmitting and receiving data to and from the external memory 1 connected to the application processor 10a. In other words, the memory controller 12 receives data for a previous frame and data for a current frame from the external memory 1. Alternatively, the memory controller 12 may receive image data corresponding to a predetermined region of an entire image.

The GPU 13 performs graphic operations on the data that the memory controller 12 has read from the external memory 1 to display the data on the display panel 250. The display controller 100a determines whether the data of the current frame has been updated from the data of the previous frame and controls the transmission of the current frame data to the display device 20 according to a determination result of the display controller 100a.

The display controller 100a may include an update detector 300 and an interrupt module 101. The update detector 300 receives the data of the current frame from the external memory 1 and determines whether the data of the current frame has been updated from the data of the previous frame. When the data of the current frame has not been updated, the display controller 100a does not transmit the current frame data to the display panel 250 and the interrupt module 101 generates an interrupt request in response to the determination result of the update detector 300, activating the PSR operation of the display device 20. When the current frame has been updated, the display controller 100a transmits the data of the current frame to the display panel 250, deactivating the PSR operation of the display device 20.

The display controller 100a may also generate an interrupt request in response to a user event, inactivating the PSR operation when the current frame has not been updated. For example, the user event may occur on the display panel when a user touches the screen of the display panel to access the next page of the contents displayed under the PSR operation on the screen of the display panel 250. Alternatively, the user event may occur when the user pushes a button on the mobile device to change screen then displayed using the PSR operation.

The interrupt controller 110 generates an interrupt signal in response to the interrupt request from the interrupt module 101.

The CPU 11 controls the overall operation of the application processor 10. In other words, the CPU 11 controls the operation of each of the elements 110, 100a, 12, 13, and 14. For instance, the CPU 11 controls the output of the transmitter 14 using a transmission control command in response to the interrupt signal from the interrupt controller 110.

The transmitter 14 may include a PSR register 16. The PSR register 16 stores at least two PSR operation control command values according the determination result of the update detector 300. The transmitter 14 outputs one of the PSR operation control command values to the display device in response to a transmission control command of the CPU 11.

Accordingly, the application processor 10a may require less power because, when a current frame has not been updated, data communications between the application processor 10a and the display panel 250 do not occur according to this embodiment of the inventive concept. More specifically, in the PSR operation when a current frame has not been updated, the application processor 10a does not send the data of the current frame to the display driver 200. The display driver 200 refreshes the display panel 250 based on the data of the previous frame stored in the RFB 202. As a result, the image data processing system 2 may extend the battery lifetime by reducing power necessary to output image data to the display driver 200.

FIG. 3 is the structure of packet information including PSR features according to the eDP standard. FIG. 4 shows a description of the field DB1 of FIG. 3.

Referring to FIG. 3, the SoC 10 sends the packet information to the display device 20. The packet information includes a header section and a data section. The header section includes four headers HB3 through HB0. The data section includes seven fields over 32 data bands DB31 through DB0. Each data band is eight bits wide. The items on a PSR secondary data packet in the eDP standard version 1.3 will be the reference to the details of the header bands HB3 through HB0 and the data bands DB31 through DB0. The PSR field of the DB1 represents whether a PSR operation is active or inactive.

Referring to FIG. 4, the data band DB1 is 8-bit packet information. The least significant bit "Bit 0" of the data band DB1 indicates information about a PSR state. The first bit "Bit 1" of the data band DB1 indicates information about whether to update the RFB 202. The second bit "Bit 2" of the data band DB1 indicates a cyclic redundancy check (CRC) value indicating whether the pixel data DB7 through DB2 of a frame has an error. The remaining bits "Bits 7:3" of the data band DB1 are reserved for a future application and may be set to "0".

When a current frame has been updated, the "Bit 0" is "0" and the PSR operation becomes inactive. In other words, the SoC of FIG. 1 transmit the image data of the current frame to the display device 200 along with the packet information, and the display device 200 select a no-update data path 206a of FIG. 1 based on the packet information. The display device 200 transmits the image data of the current frame to the display panel 250. However, when the "Bit 0" of the data band DB1 is "1", the PSR operation becomes active and the display driver 200 operates in a PSR mode. When the first bit "Bit 1" is "0", the image data of the previous frame stored in the RFB 202 is maintained as it is. However, when the first bit "Bit 1" of the data band DB1 is "1", the RFB 202 stores the image data of the current frame received from the SoC 10 through the receiver 201.

Figure 5:
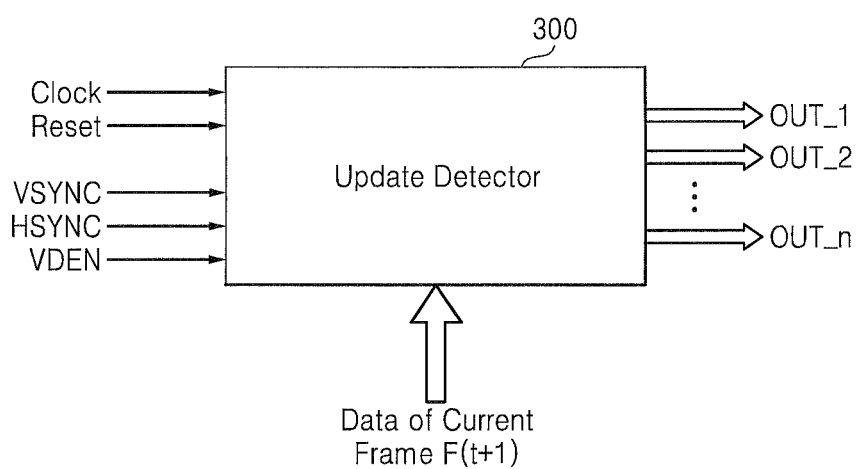
FIG. 5 is a block diagram of an update detector of FIG. 2.

FIG. 5 is a block diagram of the update detector 300 of FIG. 2. In FIG. 5, the update detector 300 may determine whether a current frame data F(t+1) has been updated based on the data of the previous frame F(t). Alternatively, the update detector 300 may determine whether data of the predetermined region of the current frame F(t+1) has been updated based on data of the corresponding region of the previous frame F(t). In other words, the determination may be performed with respect to an entire frame or a predetermined region of the frame.

The update detector 300 may receive the data of the current frame F(t+1) and check whether there has been an update to the current frame F(t+1) by using an error check algorithm in response to a clock signal Clock, a reset signal Reset, a vertical sync signal VSYNC, a horizontal sync signal HSYNC, and a video data enable signal VDEN. Further explanations will be made in reference to FIGS. 6 and 7 on how the error check algorithm is used to determine the update. Alternatively, the update detector 300 may receive image data of the predetermined region in the current frame F(t+1) and determine whether there has been an update to the image data by using an error check algorithm in response to a clock signal Clock, a reset signal Reset, a vertical sync signal VSYNC, a horizontal sync signal HSYNC, and a video data enable signal ("VDEN").

The update detector 300 may perform an error check algorithm to determine the update. The error check algorithm may include a parity check algorithm, a check sum algorithm, a cyclic redundancy check (CRC) algorithm, a secure hash algorithm (SHA), or a Hamming code algorithm. The outputs of the update detector 300 OUT_1 to OUT_n may depend on the error check algorithm used.

Figure 6:
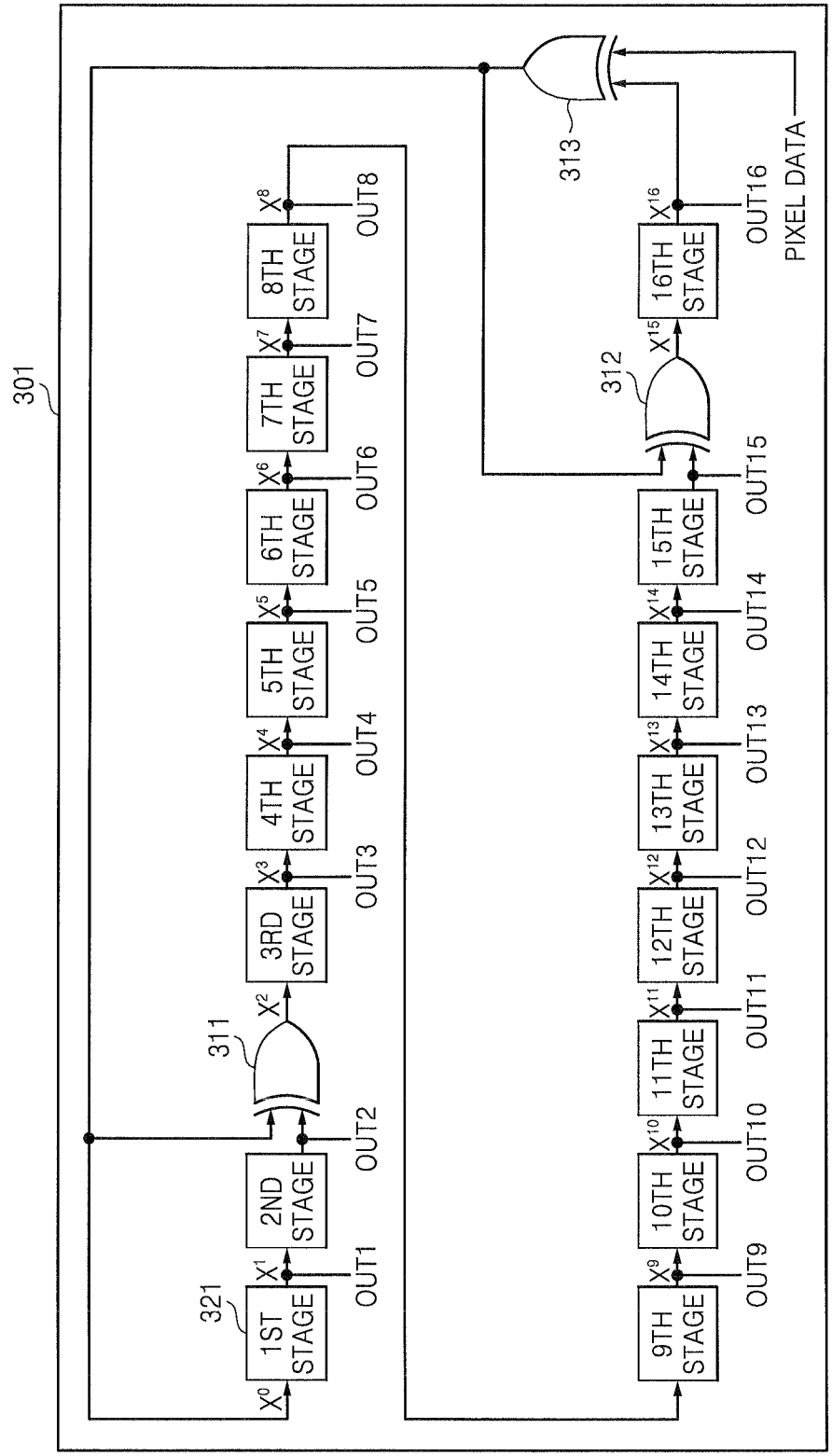
FIG. 6 is a detailed block diagram of an example of the update detector of FIG. 5.
Figure 7:
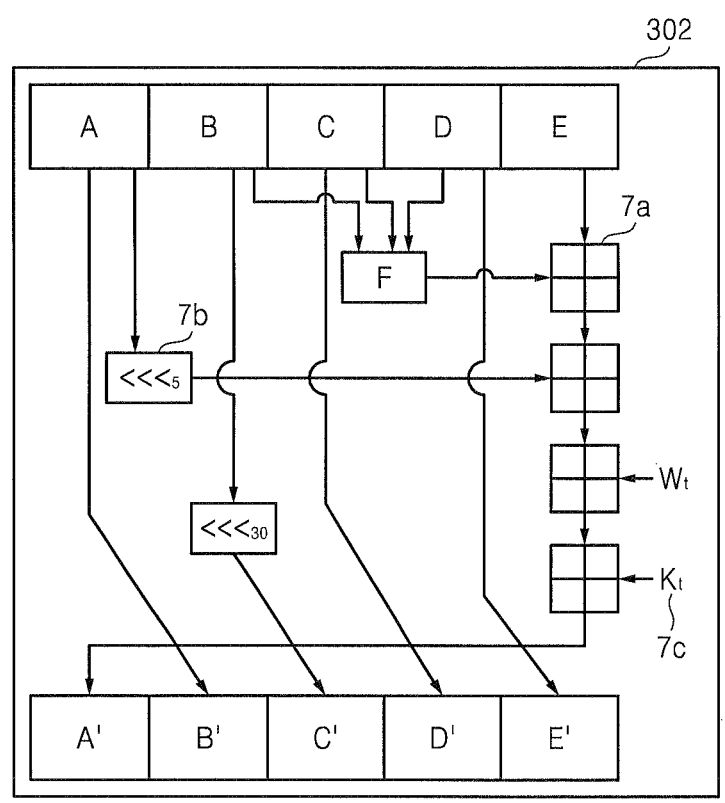
FIG. 7 is a detailed block diagram of another example of the update detector of FIG. 5.

FIG. 6 is a block diagram of an exemplary embodiment 301 of the update detector 300 of FIG. 5 using a CRC algorithm. FIG. 7 is a block diagram of an exemplary embodiment 302 of the update detector 300 of FIG. 5. In FIG. 6, the update detector 301 may be configured to implement the CRC algorithm for determining whether the data of the current frame F(t+1) has been updated. The update detector 301 detects an update by determining that the data of the current frame F(t+1) has an error based on the data of the previous frame F(t).

Specifically, the data of the current frame F(t+1) may be represented by P(x) having N bits. The CRC's divisor G(x) may be determined from the data of the previous frame F(t). The CRC's divisor G(x) may include (k+1) bits. The data P(x) may be multiplied by $x^k$ and then divided by the CRC's devisor G(x). As a result, the data P(x) may be represented by Q(x) and R(x) where Q(x) is a quotient and R(x) is a remainder as shown in Equation (1):

$$P(x)*x^k+R(x)=G(x)*Q(x) \qquad (1)$$

For instance, the CRC's divisor may be a polynomial having coefficients 1011 such as Equation (2):

$$G(x)=1*x^3+0*x^2+1*x^1+1*x^0 \qquad (2)$$

The update detector 301 may obtain the CRC's divisor G(x) from the data of the previous frame F(t) to determine whether there has been an update based on the remainder R(x) by using the CRC when the data of current frame F(t+1) is received.

In other words, when the current frame F(t+1) has not been updated, the update detector 301 detects no errors to the data of the current frame F(t+1), having the remainder R(x) equal to 0. The remainder R(x) is represented by the outputs OUT1 to OUT 16 of the update detector 301. When the current frame F(t+1) has been updated, the update detector 301 detects an error to the current frame F(t+1), having R(x) not equal to 0.

In FIG. 6, a 16-bit CRC's divisor is implemented when the data of the previous frame F(t) is 24-bit RGB pixel data. In the 16-bit CRC, G(x) is defined as Equation 3:

$$G(x)=x^{16}+x^{15}+x^2+1. \qquad (3)$$

Specifically, the division operation of the CRC algorithm using the 16-bit CRC's divisor G(x) is implemented by a linear feedback shift register 321. The shift register 321 includes sixteen states from the first stage to the sixteenth stage. The shift register 321 operates in response to the clock signal Clock. Logic circuits 311, 312, and 313 perform an addition operation to implement the polynomial equation of Equation (3). As a result, the remainder R(x) of the equation (1) is represented by the outputs OUT1 to OUT16 of the shift register 321. The remainder R(x) represents whether there has been an update to the data of the current frame F(t+1) based on the data of the previous frame F(t).

The update detector 301 is a linear feedback shift register where the data of current frame F(t+1) or P(x) is subject to the division operation bit-by-bit in response to the clock signal Clock. The inventive concept, however, is not restricted to this embodiment. The update detector 301 may be implemented by a parallel feedback shift register or various other embodiments. In the embodiments described above, the update detector 301 performs the division operation using the 16-bit CRC's divisor, but the inventive concept is not restricted thereto. The detector 301 may use 8-, 10-, 24- or 32-bit CRC's divisors.

FIG. 7 is a detailed block diagram of an exemplary embodiment 302 of the update detector 300 illustrated in FIG. 5. In FIG. 7, the update detector 302 checks on an update by determining whether a ciphering error has occurred to the data of the current frame F(t+1) with respect to the data of the previous frame F(t) using a SHA function. SHA functions are a collection of relevant cryptographic hash functions.

When 32-bit internal states A, B, C, D, and E are input, the SHA function outputs external states A', B', C', D', and E' resulting from encrypting the inputs using a continuously changing nonlinear function F, constants $K_t$ and $W_t$ (denoted by 7c), $<<<_n$ operation 7b (i.e., rotation to the left by "n" bits), and addition 7a using a $2^{32}$ module.

In the current embodiments, a 32-bit input is assumed, but the inventive concept is not restricted thereto and includes each and every case that is available with the SHA function. The details of the SHA function will be easily understood by those of ordinary skill in the art. Thus, detailed descriptions thereof will be omitted.

Figure 8:
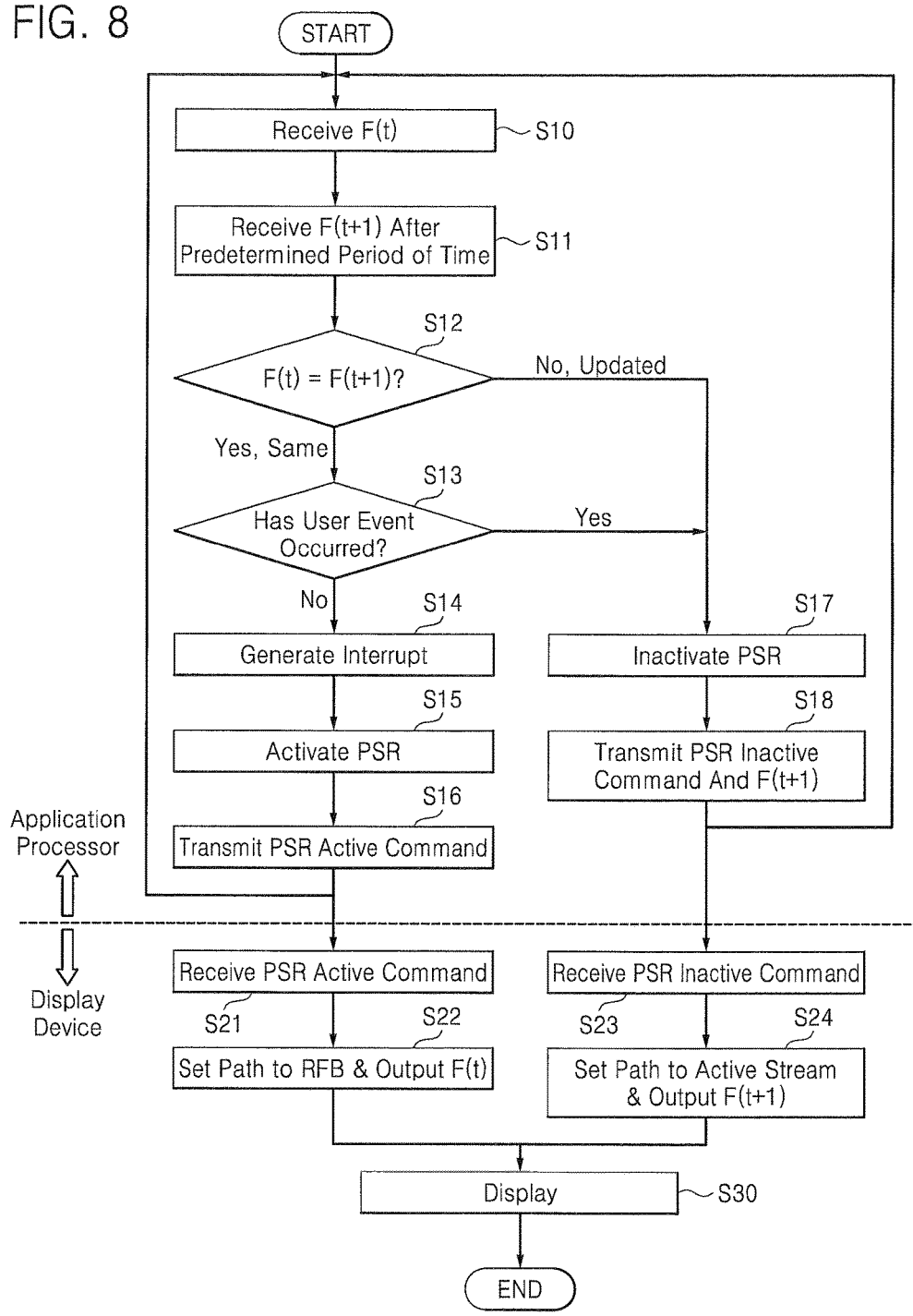
FIG. 8 is a flowchart of an operation method of a system on chip (SoC) according to an embodiment of the inventive concept.

FIG. 8 is a flowchart of an operation method of the SoC 10 according to an embodiment of the inventive concept. In operation S10, the SoC 10 receives data of a previous frame F(t) from the external memory 1. In operation S11, the SoC 10 receives data of a current frame F(t+1) while the display device 20 temporarily stores the data of the previous frame in the RFB 202, transmitting the stored data of the previous frame F(t) to the display panel 250.

In operation S12, the SoC 10 determines whether there has been an update to the data of the current frame F(t+1). Alternatively, the SoC 10 may determine whether data of a predetermined region in the previous frame F(t) is the same as that of the corresponding region in the current frame F(t+1) to determine about the update to the current frame F(t+1). Specifically, the update check may be carried out by performing an error check algorithm such as a CRC algorithm or a SHA algorithm.

When it is determined that there has been no update to the data of the current frame F(t+1) in operation S12 and it is determined that no user event has occurred in operation S13, the SoC 10 generates an interrupt signal in operation S14. In response to the interrupt signal, the PSR register 16 of FIG. 2 is set to a first register value for activating the PSR operation in operation S15. Thereafter, the SoC 10 transmits the PSR active command to the display device 20 in operation S16. In operation S21, the display driver 200 receives the PSR active command in operation S21, selecting a no-update signal path 206b of FIG. 1 in response to the PSR active command. In operation S30, the display driver 200 transmits the data of the previous frame F(t) stored in the RFB 202 to the display panel 250.

However, when it is determined in operation S12 that there has been an update to the data of the current frame F(t+1) or it is determined in operation S13 that a user event has occurred, the SoC 10 sets the PSR register 16 of FIG. 2 to a second register value to make the PSR operation inactive in operation S17. The SoC 10 transmits a PSR inactive command and the second frame F(t+1) to the display device 20 in operation S18. The first register value and the second register value correspond with PSR operation control command values.

In operation S23, the receiver 201 receives the PSR inactive command and the data of the second frame F(t+1). In response to the PSR inactive command, the selector 204 selects the update signal path 206a in operation S24. In detail, the display driver 200 transmits the data of the current frame F(t+1) along the update signal path 206a without passing through the RFB 202 to the display panel 250 in operations S24 and S30.

Accordingly, the application processor 10a may require less power because, when a current frame has not been updated, data communications between the application processor 10a and the display panel 250 do not occur according to this embodiment of the inventive concept. More specifically, in the PSR operation when a current frame has not been updated, the application processor 10a does not send the data of the current frame to the display driver 200. The display driver 200 refreshes the display panel 250 based on the data of the previous frame stored in the RFB 202. As a result, the image data processing system 2 may extend the battery lifetime by reducing power consumptions necessary to output image data to the display driver 200.

Figure 9:
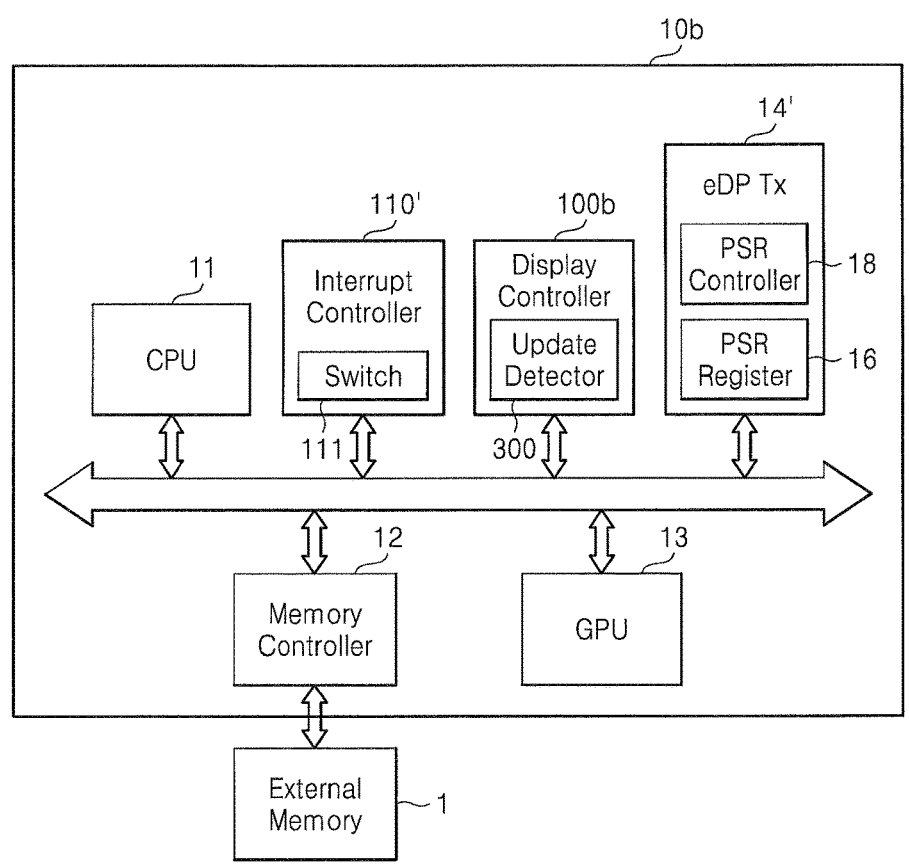
FIG. 9 is a detailed block diagram of an application processor according to an embodiment of the inventive concept.

FIG. 9 is a detailed block diagram of an application processor 10b according to an embodiment of the inventive concept. Like elements are labeled with like reference numerals with respect to the embodiment of FIG. 2 and the description of these elements is omitted here. The following description focuses on the differences from the application processor 10a of FIG. 2. In FIG. 9, the application processor 10b includes the CPU 11, the memory controller 12, the GPU 13, a transmitter 14', an interrupt controller 110', and a display controller 100b.

The display controller 100b includes the update detector 300 that determines whether a current frame has been updated from a previous frame. The transmitter 14' may includes the PSR register 16 and a PSR controller 18.

The PSR register 16 may store at least two PSR operation control command values. The PSR controller 18 may control the PSR register 16 so that one of the PSR operation control command values is output to the display device 20 according to a determination result of the update detector 300. When outputting image data such as a still image signal or a moving image signal to the display device 20, the PSR controller 18 may consider data input/output relationship and power relationship between the display device 20 and the application processor 10b and also between the display device 20 and other functional blocks of the image data processing system 2.

The interrupt controller 110' may include a switch 111. The interrupt controller 110' may generate various kinds of interrupt signals relating to the operation of the application processor 10b. The interrupt controller 110' may turn off the switch 111 while the PSR controller 18 controls the PSR register 16 and may operate independently of the PSR operation through the switch 111.

Figure 10:
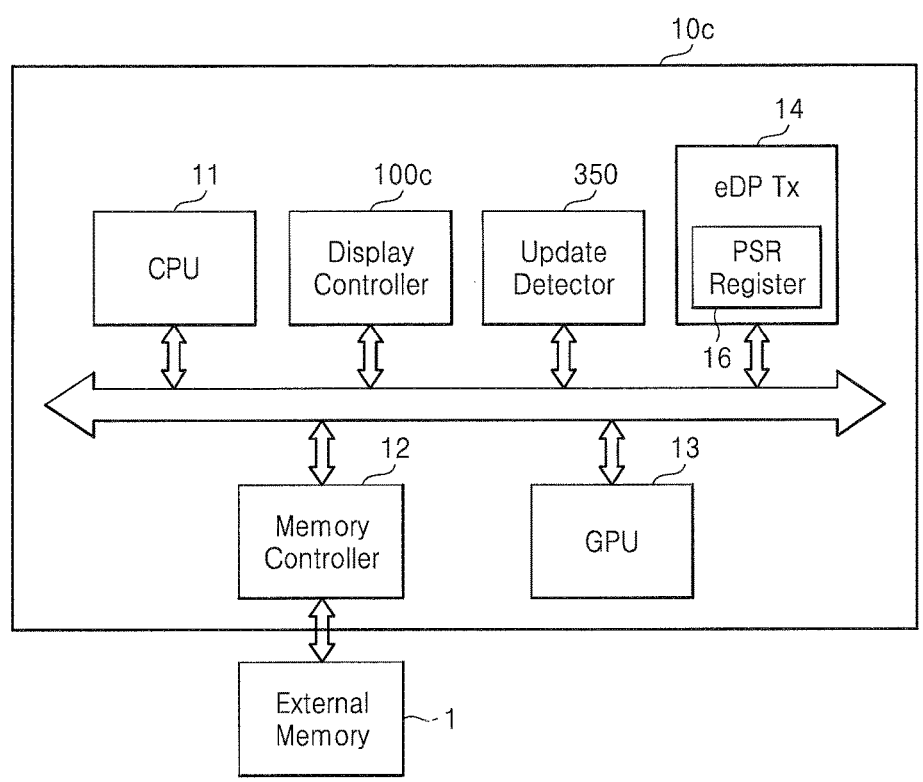
FIG. 10 is a detailed block diagram of an application processor according to an embodiment of the inventive concept.

FIG. 10 is a detailed block diagram of an application processor 10c according to an embodiment of the inventive concept. Like elements are labeled with like reference numerals with respect to the embodiment of FIG. 2 and the description of these elements is omitted here. The following description focuses on the differences from the application processor 10a of FIG. 2. In FIG. 10, the application processor 10c includes the CPU 11, the memory controller 12, the GPU 13, the transmitter 14, a display controller 100c, and an update detector 350. Unlike the embodiment of FIG. 2, the application processor 10c of FIG. 10 includes the update detector 350 implemented separately from the display controller 100c.

The update detector 350 determines whether a current frame has been updated from a previous frame and determines whether to transmit the current frame to the display device 20 according to the check result. The display controller 100c may control the operation of the display device 20 according to the determination result.

Figure 11:
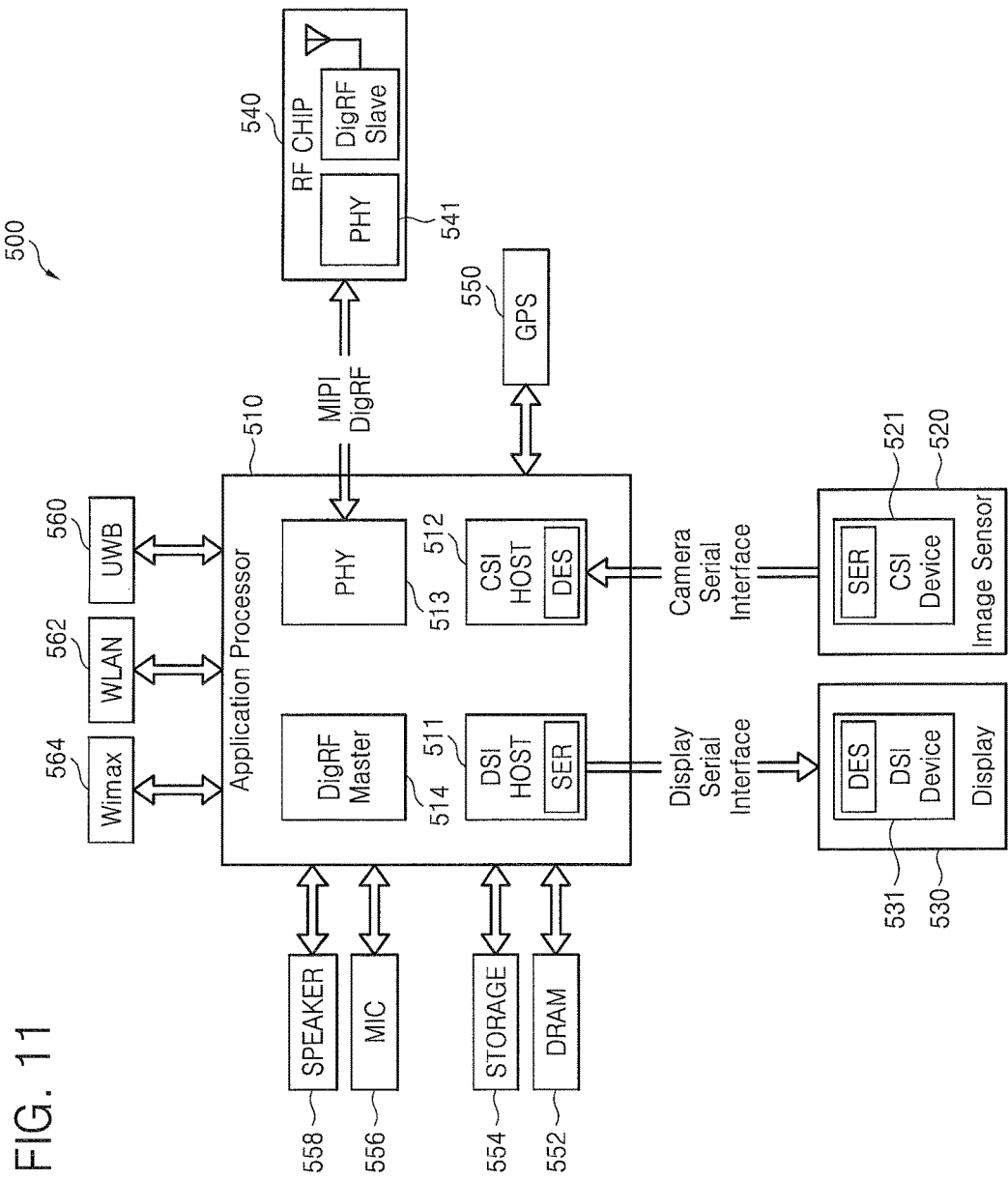
FIG. 11 is a block diagram of an image data processing system including an application processor according to an embodiment of the inventive concept.

FIG. 11 is a block diagram of an image data processing system including an application processor according to some embodiments of the inventive concept.

The image data processing system 500 may be implemented by a portable device or a mobile device, such as a personal digital assistant (PDA), a portable media player (PMP), a mobile phone, a smart phone, or a tablet computer that can use or support the MIPI interface. The electronic system 500 includes an application processor 510, an image sensor 520, and a display 530. The application processor 510 may include a CSI host 512, a DSI host 511, and a physical layer (PHY) 513. The display device may include a DSI device 531.

The CSI host 512 communicates serially with the CSI device 521 through a camera serial interface (CSI). For example, a de-serializer (DES) may be implemented in the CSI host 512, and a serializer (SER) may be implemented in the CSI device 521.

The DSI host 1011 communicates serially with the DSI device 531 through a display serial interface (DSI). For example, a serializer (SER) may be implemented in the DSI host 511, and a de-serialize (DES) may be implemented in the DSI device 531.

The image data processing system 500 may also include a radio frequency (RF) chip 540 which communicates with the application processor 510. The physical layer (PHY) 513 of the image data processing system 500 and a PHY of the RF chip 540 communicate data with each other according to a MIPI DigRF standard. The image data processing system 500 may further include at least one element among a GPS 550, a memory 552 such as a DRAM, a data storage device 554 implemented by a non-volatile memory such as a NAND flash memory, a microphone 556 and a speaker 558. The image data processing system 500 may communicate with an external device using at least a communication protocol or a communication standard such as UWB (ultra-wideband; 560), WLAN (Wireless LAN; 562), WiMAX (worldwide interoperability for microwave access; 564), or LTE™ (long term evolution) etc.

According to this embodiment of the inventive concept, the DSI host 511 may perform functions of the display controller 100 of FIG. 2

As described above, according to this embodiment of the inventive concept, provision of moving image information is determined by deciding whether a frame has been updated and the PSR operation of a display driver is controlled according to the determination result, so that the power consumption for the PSR operation of a display device is reduced.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A system on chip (SoC) comprising:
a display controller receiving data of a current frame and determining whether the data of the current frame has been updated from data of a previous frame; and
a transmitter outputting a panel self-refresh (PSR) inactive command and the data of the current frame when the display controller determines that the data of the current frame has been updated and outputting a panel self-refresh (PSR) active command when the display controller determines that the data of the current frame has not been updated,
wherein the display controller includes an update detector performing a single cyclic redundancy check operation based on the data of the previous frame to determine whether the data of the current frame has been updated,
wherein the cyclic redundancy check operation has a CRC's divisor, wherein the CRC's divisor is determined based on the data of the previous frame and a determination result of the determining of whether image data of a current frame is updated is represented by a remainder of the cyclic redundancy check operation, and
wherein the data of the current frame are data of a predetermined region of the current frame, and the data of the previous frame are data of a corresponding region of the previous frame.

2. The SoC of claim 1,
wherein the display controller further comprises:
an interrupt module generating an interrupt request for the PSR inactive command when the update detector determines that the current frame has been updated.

3. The SoC of claim 1, further comprising:
an interrupt module generating an interrupt request for the PSR inactive command when a user event occurs.

4. The SoC of claim 3,
wherein the user event occurs when a user touches a screen.

5. The SoC of claim 2, further comprising:
an interrupt controller transmitting an Interrupt signal in response to the interrupt request; and
a central processing unit generating a transmission control command in response to the interrupt signal.

6. The SoC of claim 5,
wherein the transmitter comprises a register storing at least two panel self-refresh operation control command values and to output one of the at least two panel self-refresh operation control command values in response to the transmission control command to a display device.

7. The SoC of claim 1,
wherein the display controller further comprises:
a central processing unit generating a transmission control command according to a determination result of the update detector, wherein the transmitter outputs a panel self-refresh operation control command value corresponding to the determination result of the update detector to a display device.

8. The SoC of claim 7,
wherein the transmitter comprises a register storing the panel self-refresh operation control command value.

9. The SoC of claim 7,
wherein the transmitter comprises:
a register storing at least two panel self-refresh operation control command values; and
a panel self-refresh controller controlling the register to output one of the panel self-refresh operation control command values to the display device according to a determination result of the update detector.

10. The SoC of claim 1, further comprising:
a memory controller receiving the data of the current frame and the data of the previous frame from a memory.

11. An operation method of a system on chip (SoC), which is connected between a memory and a display device to control an operation of the display device and complies with an Embedded Display Port (eDP) standard, comprising the steps of:
receiving image data of a current frame;
determining whether the image data of a current frame is updated based on image data of a previous frame by performing a single cyclic redundancy check operation;
outputting a panel self-refresh (PSR) inactive command and the image data of the current frame to the display device according to the eDP standard, when it is determined that the image data of the current frame has been updated from the data of the previous frame; and
outputting a panel self-refresh (PSR) active command without the data of the current frame to the display device according to the eDP standard, when it is determined that the data of the current frame has not been updated from the data of the previous frame,
wherein the cyclic redundancy check operation has a CRC's divisor, wherein the CRC's divisor is determined based on the data of the previous frame and a determination result of the step of determining whether the image data of a current frame is updated is represented by a remainder of the cyclic redundancy check operation.

12. The operation method of claim 11,
wherein the data of the current frame are data of a predetermined region of the current frame, and the data of the previous frame are data of a corresponding region of the previous frame.

13. The operation method of claim 11,
wherein the step of outputting the panel self-refresh active command comprises the steps of:
generating an interrupt signal when it is determined that the current frame has been updated from the previous frame;
setting a first register value for a panel self-refresh operation in response to the interrupt signal; and
outputting the panel self-refresh active command based on the first register value.

14. The operation method of claim 11, further comprising a step of outputting a panel self-refresh (PSR) inactive command when a user event has occurred.

15. A method of operating an image data operating system, the method comprising the steps of:
displaying a still image with data of a previous frame;
generating a new image data;
determining whether the new image data has been updated based on the still image by performing a single cyclic redundancy check operation; and
displaying the new image data and storing the new image data when it is determined that the new image data has been updated,
wherein the cyclic redundancy check operation has a CRC's divisor, wherein the CRC's divisor is determined based on the data of the previous frame and a determination result of the step of determining whether the image data of a current frame is updated is represented by a remainder of the cyclic redundancy check operation.

16. The operation method of claim 15, further comprising a step of generating an interrupt signal in response to a determination result of the step of the step of determining whether the image data of a current frame has been updated.

* * * * *